United States Patent [19]
Rohm

[11] Patent Number: 5,511,694
[45] Date of Patent: Apr. 30, 1996

[54] APPARATUS AND ARTICLE FOR DETERMINING AND INDICATING LIQUID CONTENT OF KEGS OR BARRELS

[76] Inventor: Edward J. Rohm, 250 Locust St., Pittsburgh, Pa. 15229

[21] Appl. No.: 183,437

[22] Filed: Jan. 19, 1994

[51] Int. Cl.⁶ .................................................. B67D 5/12
[52] U.S. Cl. .............................. 222/27; 222/32; 222/36; 222/641
[58] Field of Search ........................ 222/23, 31–33, 222/36, 639–641, 505, 27, 28, 25

[56] References Cited

U.S. PATENT DOCUMENTS

| | | | |
|---|---|---|---|
| 3,091,366 | 5/1963 | Hutsell | 222/36 |
| 3,248,009 | 4/1966 | Sutton et al. | 222/36 X |
| 3,257,033 | 6/1966 | Stott | 222/36 |
| 3,831,812 | 8/1974 | Dolan | 222/36 X |
| 4,225,057 | 9/1980 | Horn | 222/36 X |
| 4,436,223 | 5/1984 | Wilson | 222/36 |
| 5,303,845 | 4/1994 | Osawa | 222/36 |

*Primary Examiner*—Kevin P. Shaver
*Attorney, Agent, or Firm*—Clifford A. Poff

[57] ABSTRACT

Equipment is provided to solve the problem of affording information, in connection with dispensing of beverage from a pressurized keg via a tap controlled with a tap handle, about the level of beverage remaining in the keg. Preferably, the tap handle is caused to contain a power source, a position-sensitive switch, a microprocessor containing a timer, a reset associated with the microprocessor to be activated when a new keg is started, a device for causing the microprocessor to accumulate an aggregate amount of time since the reset was most recently activated, and a display or output responsive to the microprocessor to give signals (clock-face-style display, digital and/or alphanumeric display, or in some aspects of the invention, a flashing light or even simply an audible signal) to let the user know what the level of liquid in the keg is or that it has reached a point near to the end of the quarter-barrel or half-barrel keg now in use.

11 Claims, 2 Drawing Sheets

APPARATUS AND ARTICLE FOR DETERMINING AND INDICATING LIQUID CONTENT OF KEGS OR BARRELS

BACKGROUND OF THE INVENTION

1. Field of the Invention

This invention relates to the dispensing of liquids, and more particularly it has to do with the dispensing of beverages provided in a keg or barrel, such as (possibly) cola or soda, or (more likely) ale or beer. Both in commercial establishments (bars and taverns) and in private clubs and homes, there repeatedly arises the problem of gauging, from time to time, how much liquid still remains in a particular barrel or keg. The present invention has as an object the solving of that problem in a manner which is especially convenient and inexpensive, so much so that the invention may find use wherever beverages on tap are being dispensed, whether in commerce or in the home.

2. Description of the Prior Art

There exist, as a background for this invention, all the present practices concerning the dispensing of liquids, especially liquid beverages, and most especially beer.

Beer is commonly provided not only in cans or bottles of various sizes (the 7-ounce pony bottle, the standard 12-ounce bottle or can, and the larger 16-ounce and even 24-ounce bottle or can, and the 32-ounce quart and even larger 40-ounce bottles) but also in aggregates of these (six-packs of cans or bottles and 24-unit cases) and in single glasses (smaller or larger) or pitcher (also smaller or larger) drawn from a keg.

The "barrel", when used as a term for a unit of capacity, refers to quite a large quantity of liquid, namely, 31.5 gallons. Any keg containing one barrel of beer would be too heavy to be handled at all conveniently by most persons: the weight of beer, per unit of volume, is not substantially different from that of water, which can be stated in various ways: 1 gram per cubic centimeter, 62.4 pounds per cubic foot, 8.3 pounds per gallon, or about 265 pounds per barrel. In commerce, we have quarter-barrel and half-barrel kegs, which are of more manageable weight and size, containing as they do about 65½ and 133 pounds of beer, respectively. The "quarter" (a quarter-barrel keg) contains a quantity of beer equal to that in three and a half (3½) cases of 12-ounce bottles or cans, with 24 cans or bottles to the case. The "half" (a half-barrel keg) corresponds to seven (7) cases of 12-ounce bottles or cans.

The kegs currently in use for dispensing beer are, nowadays, most commonly pressurized by means of a source of carbon-dioxide gas which is supplied, via a pressure-regulator, to exert upon the beer some known and predetermined and suitable degree of super-atmospheric pressure, such as 8 lbs. per square inch gage. The rate of flow of the beer or other liquid contained in a keg through the tap, when its valve is open, is proportionate to the super-atmospheric pressure that is so exerted upon the liquid contained in the keg.

It is also properly a part of the background of the present invention that it is known that when a keg is provided with a gas pressure of 8 pounds per square inch gage, it takes approximately 8 seconds to fill a 12-ounce glass of beer, which works out to an aggregate pouring time of something like 3 minutes and 12 seconds (3:12) for the quantity of beer contained in a case of 24 bottles or cans, or then, in the case of a "quarter", 11 minutes and 12 seconds, and in the case of a "half", 22 minutes and 24 seconds.

The problem of arriving at a display of the quantity of liquid remaining in a keg is an old one, and in general, the known answers to it have been unsatisfactory, largely from not only the size but also the expense and inconvenience of the equipment needed for the purpose.

It has long been apparent, for example, that the keg may be mounted upon some means for weighing it, with there also being provided some operative connection from the weighing means to a means for displaying the current weight at a location easily seen by the person operating the tap. There would be no reason, with such equipment, to insist that the display concerning the beer remaining be located within the tap handle, but it would need to be put somewhere about the work area, and electric lines need to be run to it, and there is the problem that the weighing means needs to be sturdy enough to withstand having quarter- or half-barrel kegs of beer repeatedly loaded on to it and removed from it. It is understandable that there has been no widespread adoption of any such idea.

As will be explained below, the present invention involves a tap handle, a display means located therein, a power source, a microprocessor which has timing capability or some associated independent timer means, and a position-sensitive switch, such as a mercury switch. Tap handles are known. Display means are known, both in general and in a small size, suitable for being contained in the face portion of a tap handle. Power sources (batteries) small enough to be contained in a tap handle are known. Microprocessors are known. Mercury switches per se are known in general. Thus, the particular individual components of apparatus required for the practice of the present invention are not, per se, novel. The combination, however, of a mercury or other position-sensitive switch plus a surrounding tap handle, alone or with the other associated equipment provided in accordance with the present invention, is believed to be novel and unobvious, as is also the idea of combining such equipment as a way of providing a solution to the particular problem which the present invention addresses.

SUMMARY OF THE PRESENT INVENTION

Equipment is provided to solve the problem of affording information, in connection with dispensing of beverage from a pressurized keg via a tap controlled with a tap handle, about the level of beverage remaining in the keg. Preferably, the tap handle is caused to contain a power source, a position-sensitive switch, a microprocessor means containing a timer means, reset means associated with the microprocessor to be activated when a new keg is started, means for causing the microprocessor to accumulate an aggregate amount of time since the reset means was most recently activated, and a display or output means responsive to the microprocessor means to give signals (clock-face-style display, digital and/or alphanumeric display, or in some aspects of the invention, a flashing light or even simply an audible signal) to let the user know what the level of liquid in the keg is or that it has reached a point near to the end of the quarter-barrel or half-barrel keg now in use.

BRIEF DESCRIPTION OF THE DRAWINGS

The present invention will be more fully understood when the following description is read in light of the accompanying drawing in which.

DETAILED DESCRIPTION OF THE PREFERRED EMBODIMENTS

Figure 1:
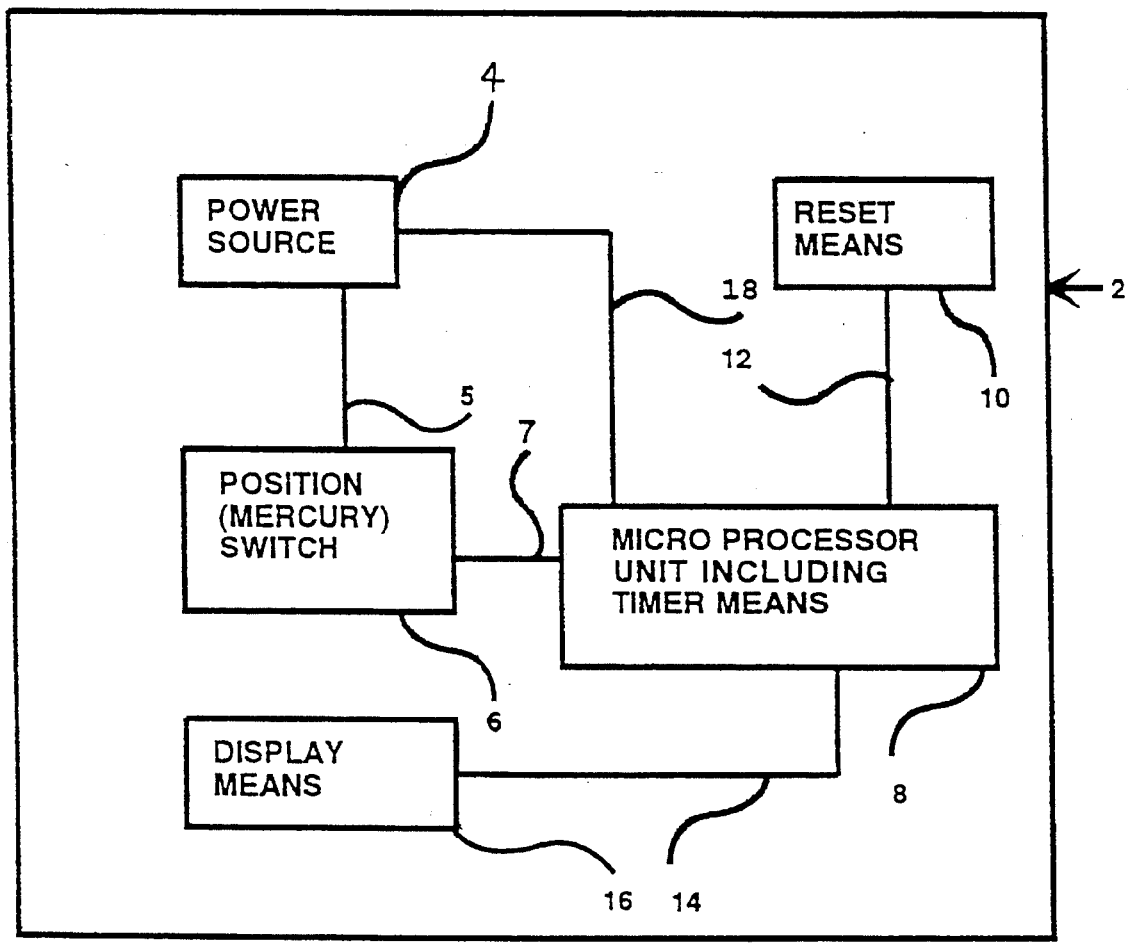
FIG. 1 is a block diagram indicating the parts or features essential to an apparatus or article in accordance with the present invention.

The principles of the present invention will become apparent from a consideration of the diagram, FIG. 1, which presents in block-diagram form one family of embodiments of the present invention.

Figure 2:
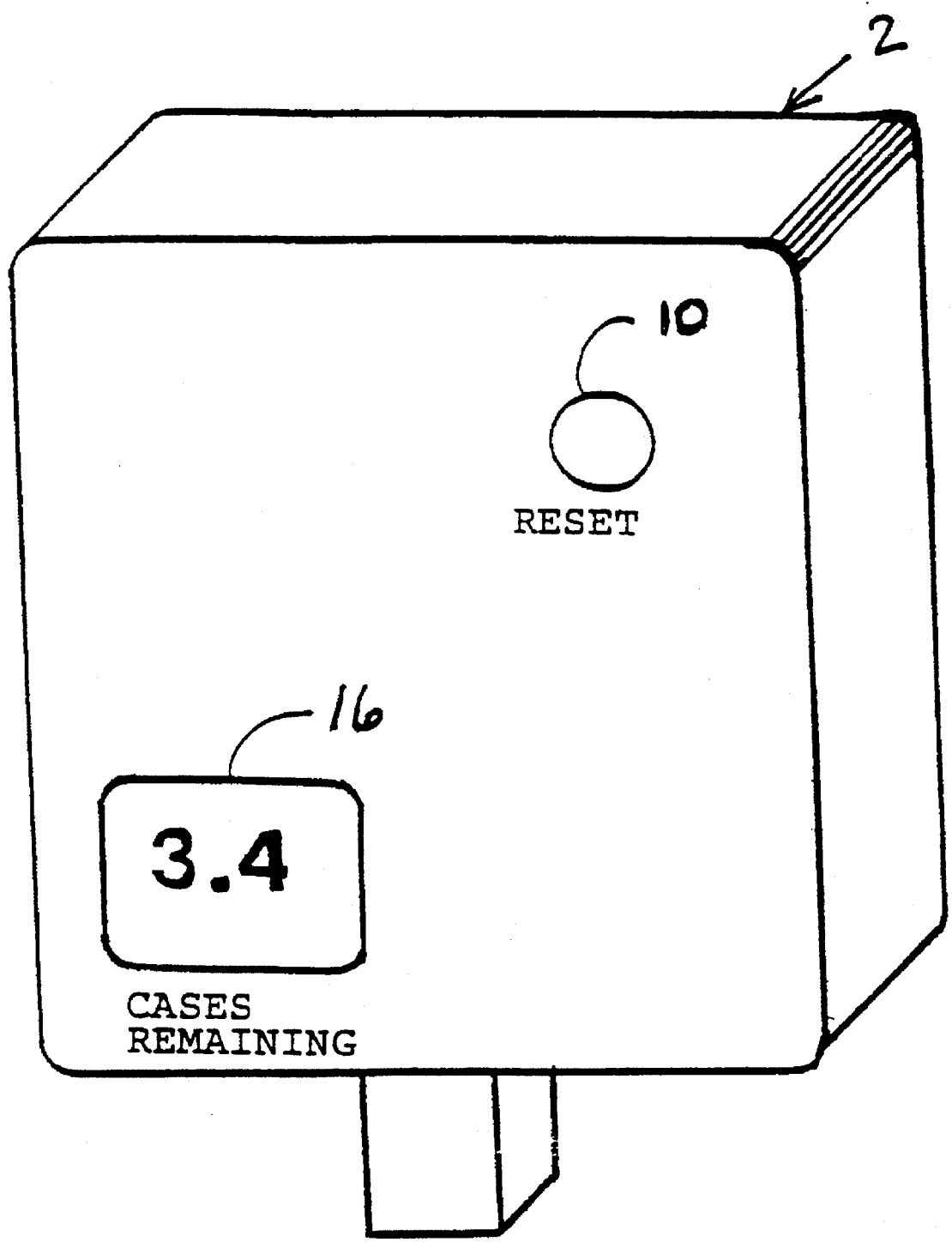
FIG. 2 is an isometric illustration of a typical tap handle for containing the parts shown diagrammatically shown in FIG. 1.

In accordance with the embodiments covered by FIG. 1 and 2, there is provided a tap handle, indicated generally at 2. The tap handle itself contains, as there indicated, everything which is necessary to enable the tap handle to display, either continuously or, preferably, from time to time, at the least what the user of the tap with which said tap handle 2 is associated needs to know about the quantity of liquid remaining in the keg from which liquid is withdrawn by means of the tap handle 2. Thus, the tap handle 2 contains a power source 4, and connected thereto by a line 5, it contains a position-sensitive (mercury) switch 6, which is also connected via a line 7 to a microprocessor unit 8. The unit 8 is one which contains (among other things, but importantly) a timer means, of a nature to be more particularly defined hereinafter. The tap handle 2 further contains a reset means 10, which has communication with the microprocessor unit 8 via a line 12. The microprocessor unit 8 has communication via a line 14 with a display means 16. The power source 4 is preferably also connected with the unit 8 via a line 18.

The exact details concerning such matters as particular pieces of equipment to be specified, such as the kind and size and location of the power source (battery) or of the display means that is used or of exactly what the programming of the microprocessor unit consists, such matters really form no essential part of the invention. As those skilled in the art are well aware, the precise engineering of a suitable device, given the idea of combining these features in a tap handle to overcome the problem of gaging the quantity of liquid remaining in the keg, is a task well within the capabilities of any person of ordinary skill in the art.

The power source is preferably a battery of suitable physical size as to be fitted within the tap handle 2 and of adequate voltage and capacity for operating the equipment of the invention. In this regard, it will be possible to program the microprocessor unit 8 in such a manner that the equipment such as the microprocessor unit 8 and the display means 16 becomes dormant during periods between the occasions of the operation of the tap handle, in order to save upon the amount of current used and thus on required battery capacity. Moreover, there is not to be ruled out the providing of a rechargeable battery of some sort, and possibly some manner of recharging the battery in situ during a protracted period of non-use, such as overnight.

One essential feature of equipment according to the invention is that there be provided a position-sensitive switch 6, such as a mercury switch, and preferably that it be one which causes current to flow when the tap handle has been moved to a fluid-drawing position and causes current to be cut off when the tap handle is moved to its tap-closed position.

What is required in a timer means according to the invention, one contained in microprocessor unit 8, is that it will produce a signal which is proportionate to the aggregate amount of time, since the most recent operation of the reset means 10, that the tap handle has been in a fluid-dispensing position and thus a signal which is proportionate to the amount of beverage that has been dispensed since that event. The reset means 10 is activated, of course, only when a new keg is started.

The microprocessor unit 8 may be programmed in various ways, either to include or omit certain features, as will be apparent to those skilled in the art, but in accordance with one advantageous set of criteria for programming the microprocessor unit 8, the program utilized will afford the following features:

(1) To conserve the life of the power source 4, the display means 16 and the microprocessor unit 8 will be put into a condition of dormancy ("go to sleep") during periods of inactivity.

(2) When the tap handle 2 is pulled to a fluid-dispensing position, the microprocessor unit 8 and display means 16 will be activated ("awaken").

(3) The display is an alphanumeric display, and it indicates the quantity of beer remaining in a keg in units of tenths of a case as shown in FIG. 2.

(4) When the tap handle 2 moves to a fluid-dispensing position, the display means is activated and remains activated until the tap handle 2 has returned to its closed position and remained there for a suitable period of time, such as 30 seconds.

(5) The reset means 10 is in the nature of a button which can be pushed, and preferably it operates the equipment in the full re-setting mode (starting a new calculation of aggregate time and fluid remaining in the keg) only when it is pushed in a certain predetermined manner, such as being held down continuously for some predetermined number of seconds. Other times that the button is pushed, for example, the display unit 16 is activated but nothing else happens. This makes it possible to check the amount of beverage remaining in the keg without starting to draw any of it.

(6) In accordance with a particularly advantageous manner of programming the microprocessor unit 8, momentarily depressing the reset button 10 causes a display on the display means 16 for a period of 30 seconds, but the device can be made to keep track of more than just the amount of liquid remaining in the keg currently being worked upon: the device can be made also to keep track of inventory (number of kegs of this kind that have been used since the most recent inventory-reset): when the button is held in for two (2) seconds, the display shows the number of barrels used since the last resetting of the inventory (which may be done on a daily, weekly, or a monthly basis).

(7) When the button 10 is held in for six (6) seconds, the display shows a blinking or flashing numeral "7", which represents the reset point for a half-barrel (seven cases) of beer. This will continue for some predetermined amount of time, such as 30 seconds, and if the reset button 10 is depressed and held in for two (2) seconds during that time, the microprocessor unit 8 will re-set in the manner proper for starting to use a new half-barrel keg. When the button 10 is held in for ten (10) seconds, the display means shows a flashing or blinking "3.5", and the microprocessor unit 8 is held ready for the next 30 seconds or other predetermined period of time to receive, when the button 10 is held in for two (2) seconds, the order to reset in the manner proper for starting the use of a quarter-barrel keg.

(8) The reset button 10 is also used to allow for the adjustment needed in the case of using a different value for the pressure of carbon dioxide employed in the system, in the event that some value other than 8 pounds per square inch gage is employed. For example, there is used a program such that if the reset button is held down for a period of fourteen (14) seconds, then the display shows a flashing or blinking "8", the program being such that the pressure of 8 pounds per square inch gage is the "default value" presumed by the program in the absence of the setting of any other alternative value. There may be provided, for example, the capability of changing the pressure counted upon as being used in the delivery system to such other values as 10, 12, 14, and 6 pounds per square inch gage; when the display is displaying a flashing "8", then pressing the reset button for two (2) seconds will change the pressure setting from 8 pounds per square inch gage to 10, and successive further pressing of the reset button for intervals of two (2) seconds will change the pressure setting from 10 to 12, then to 14, then to 6, then to 8 again. The microprocessor unit 8 contains in its memory the information concerning what volume of liquid is delivered per unit of time at each of the above pressure settings.

MODIFICATIONS AND EQUIVALENTS

The display means contained in the tap handle may present something like a clock face with a movable single hand and numbers corresponding to the number of gallons (or pints) left in the keg, but those skilled in the art will appreciate that there could be used just as well a more modern, no-moving-parts display means such as a liquid-crystal or LED (light-emitting diode) display of the kind sometimes used in wristwatches or the like, and that in the latter case, the number displayed may be, depending upon the program adopted for the microprocessor means and the particular multiplications contained therein, likewise a number of remaining gallons or pints or cases or individual glasses or servings of some predetermined capacity.

In another and a slightly broader aspect of the invention, there may be used something which is classifiable as an output means without being, strictly speaking, a display means. This refers to the possibility that one might employ simply an audible signal or a system of audible signals, beeps or tweets or chimes, possibly not much different from the alarm signals emitted by some digital watches, to indicate that the level of beer in the keg is near the end of a "quarter" or a "half".

In what may be considered the absolutely broadest aspect of the present invention, so far as is known to the inventor, the time of delivering beer or the like through a tap is done with the equivalent of a stopwatch, except that (for obvious reasons) the use of a stopwatch is impossible: the barkeeper or other operator of the tap handle usually has both hands in operation, one holding the tap handle and the other holding the container or vessel into which the beverage is to be delivered, so that if there is any timing to be done, it needs to be activated and deactivated by some separate means, such as the bartender's feet. If the bartender will, when he or she commences to draw a beer, activate a switch by a foot pedal to start the timing of the drawing of the beer, and also, when the operation of removing beer from the keg has been completed, de-activate by said foot pedal, there can be arranged an appropriate apparatus such that the signal which are received from the said foot pedal are "remembered" and "totaled", so that there is derived a signal proportionate to the quantity of beverage which has already been dispensed, and thus it is possible to derive from that signal one which is to be displayed, whether in the tap handle or elsewhere, which is proportionate to the amount left, that being the difference between the amount already dispensed and the amount present in a filled keg before any was dispensed.

Separate buttons can be provided for any one or more of the following: activating the display, resetting when a new keg is started, and resetting the pressure of carbon dioxide, and changing the count of inventory.

As an equivalent of a line such as the lines 5, 7, and so forth, there may be used in place of the usual electrical conductor some other form of operative connection, such a fiber-optics line, or even a different sort of operative link such as equipment for emitting a radio-wave or other electromagnetic signal and other equipment adjacent to the display means for receiving and responding to the same. With the use of such equipment, it may be possible to provide a larger and more legible display which is not limited in its size by being located within the particular tap handle associated with a particular tap, but rather one which responds as required to signals from any one of a plurality of tap handles.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An article of manufacture in the nature of a handle for the valve of a tap for delivering and dispensing into a container a liquid under pressure which is derived from a source container, said handle containing a display means for indicating the quantity of said liquid currently present in said source container and said handle contains also and in operative relationship to one another a microprocessor means having timing capability, a power source, a position-sensitive electrical switch responsive to operative movement of said valve by said handle, and a reset means for starting a new calculation of aggregate time and liquid remaining in said container, such that said display means exhibits indicia dependent upon the aggregate length of time that the said handle has been in its open position.

2. Apparatus as defined in claim 1 wherein the display means exhibits indicia dependent upon the aggregate length of time that the handle has been in its Open position since of the reset means was last actuated.

3. Apparatus as defined in claim 1 wherein said display means exhibits indicia dependent upon both the aggregate length of time that the handle has been in its open position and a volume of liquid that is delivered per unit of time.

4. Apparatus as defined in claim 3 wherein said reset, means are provided to adjust for difference values or different pressure settings for the pressure acting on the fluid medium in the container.

5. Apparatus as defined in claim 4 wherein the volumes of liquid that are delivered per unit of time is dependent upon the pressure on the liquid in the source .container.

6. Apparatus for indicating the level of liquid in a keg which is delivered therefrom via a tap having an operative handle member, which apparatus comprises, in combination, means for timing the opening and the closing of said tap and the interval therebetween comprising a position sensitive switch located in a tap handle associated with a delivery system of said keg, means located in a tap handle of said tap associated with the delivery system of said keg for re-setting said means for timing the opening and closing of said tap and the interval therebetween, means located in said tap handle associated with the delivery system of said keg responsive to each of the means for timing and the means for re-setting, for creating a volume-indicating signal proportionate to an aggregate amount of time that said tap has been opened since said means for re-setting said means for timing the opening and closing of said tap and the interval therebetween was last activated, and an output means responsive to said means for creating a volume-indicating signal comprising a display means located within said tap handle.

7. Apparatus as defined in claim 6 wherein said means for creating a volume-indicating signal comprises a power source and a microprocessor means responsive thereto, said power source and microprocessor means also being located within said tap handle.

8. Apparatus as defined in claim 7 wherein said display means exhibits indicia dependent upon both the aggregate length of time that the handle has been in its open position and a volume of liquid that is delivered per unit of time.

9. Apparatus as defined in claim 8 wherein said reset means are provided to adjust for different values of pressure acting on the liquid in the keg.

10. Apparatus as defined in claim 9 wherein the volumes of liquid that are delivered per unit of time is dependent upon the pressure on the liquid in the keg.

11. An article of manufacture comprising a handle for a valve of a tap for delivering and dispensing into a container a liquid under pressure which is derived from a source container, said handle containing a display means for indicating the quantity of said liquid currently present in said source container and the display means exhibits indicia dependent upon both the aggregate length of time that the handle has been in its open position and a volume of liquid that is delivered per unit of time, and a reset means in said handle for starting a new calculation or aggregate time and fluid remaining in said container.

* * * * *